United States Patent
Tran et al.

(10) Patent No.: US 12,379,918 B2
(45) Date of Patent: Aug. 5, 2025

(54) SYSTEM AND METHOD FOR UPGRADING NON-PERMITTED OPERATING SYSTEMS ON STANDALONE COMPUTING SYSTEMS

(71) Applicant: Bank of America Corporation, Charlotte, NC (US)

(72) Inventors: Ngoc Anh Tran, Charlotte, NC (US); Yaksh Kumar Singh, Greater Noida (IN); Maneesh Kumar Sethia, Hyderabad (IN); Amit Mishra, Chennai (IN); Pavan Kumar Kanamarlapudi, Hyderabad (IN); Saurabh Garg, Faridabad (IN); Abhijit Behera, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 201 days.

(21) Appl. No.: 18/361,071

(22) Filed: Jul. 28, 2023

(65) Prior Publication Data
US 2025/0036388 A1     Jan. 30, 2025

(51) Int. Cl.
G06F 9/44     (2018.01)
G06F 8/65     (2018.01)
G06F 21/57     (2013.01)

(52) U.S. Cl.
CPC ............ *G06F 8/65* (2013.01); *G06F 21/57* (2013.01)

(58) Field of Classification Search
CPC ........................................................ G06F 8/65
USPC ........................................................ 717/168
See application file for complete search history.

(56) References Cited

U.S. PATENT DOCUMENTS

| | | | |
|---|---|---|---|
| 8,346,897 B2 | 1/2013 | Jaroker | |
| 8,635,272 B2 | 1/2014 | Reisman | |
| 8,799,994 B2 | 8/2014 | Barton | |
| 8,881,229 B2 | 11/2014 | Barton | |
| 9,069,579 B2 | 6/2015 | Ben-Shaul | |
| 9,477,491 B2 | 10/2016 | Ben-Shaul | |
| 9,521,147 B2 | 12/2016 | Barton | |
| 9,569,200 B2 | 2/2017 | Filali-Adib | |
| 9,948,617 B2 * | 4/2018 | Wysocki | H04L 67/34 |
| 10,007,597 B2 | 6/2018 | Barnett | |
| 10,218,778 B2 | 2/2019 | Wesley | |

(Continued)

FOREIGN PATENT DOCUMENTS

WO    WO-2023092994 A1 *   6/2023

*Primary Examiner* — Evral E Bodden

(57) ABSTRACT

A method includes receiving a request. The request is encrypted to generate an encrypted request. The encrypted request includes a version information for a first software package deployed in a standalone computing system, and a region information and a hardware information for the standalone computing system. The encrypted request is sent to a respective regional data center of a cloud computing system based on the region information of the first software package. A second software package is identified among software packages stored in the respective regional data center. The second software package corresponds to the hardware information of the first software package. The version information of the first software package is compared to a version information of the second software package. In response to identifying that the second software package is more recent than the first software package, the second software package is deployed to the standalone computing system.

20 Claims, 3 Drawing Sheets

(56) References Cited

U.S. PATENT DOCUMENTS

| | | |
|---|---|---|
| 10,365,909 B2 | 7/2019 | Clothier |
| 11,269,619 B2 * | 3/2022 | Rouland ............... H04L 9/3236 |
| 11,868,755 B2 * | 1/2024 | Vladimerou .............. G06F 8/65 |
| 2013/0227538 A1 * | 8/2013 | Maruyama ................ G06F 8/65 |
| | | 717/168 |
| 2019/0303541 A1 | 10/2019 | Reddy |
| 2019/0303623 A1 | 10/2019 | Reddy |
| 2019/0305959 A1 | 10/2019 | Reddy |
| 2020/0151335 A1 * | 5/2020 | Ayoub ................ H04L 63/0435 |
| 2021/0258377 A1 | 8/2021 | Arthursson |

* cited by examiner

SYSTEM AND METHOD FOR UPGRADING NON-PERMITTED OPERATING SYSTEMS ON STANDALONE COMPUTING SYSTEMS

TECHNICAL FIELD

The present disclosure relates generally to upgrading computing systems, and more specifically to a system and method for upgrading non-permitted operating systems on standalone computing systems.

BACKGROUND

At times, standalone computing systems of service providers are running on legacy operating systems. It is challenging to upgrade standalone computing systems with latest updates frequently and/or smoothly due to dependency on hardware. Furthermore, it is also challenging to upgrade applications of standalone computing systems along with upgraded operating systems. Standalone computing systems may become vulnerable when operating systems of standalone computing systems reach end-of-life support or non-permitted technology cycles.

SUMMARY

The system described in the present disclosure provides several practical applications and technical advantages that overcome the current technical problems with upgrading non-permitted operating systems on standalone computing systems.

In general, a system comprises a cloud computing system operably coupled to a standalone computing system and a user device via a network. The standalone computing system and the cloud computing system are managed by a service provider. In certain embodiments, the service provider may be a financial institution (e.g., a bank). In such embodiments, the standalone computing system may be an automated teller machine (ATM) maintained by a respective bank. Various users are allowed access to the ATM and the cloud computing system. Clients of the bank receive services from the cloud computing system via the ATM. Bank associates manage the ATM and the cloud computing system.

In operation, the standalone computing system receives a request from a user and encrypts the request to generate an encrypted request. In certain embodiments, in addition to the encrypted information of the request, the encrypted request further comprises a version information for a software package deployed in the standalone computing system, a region information for the standalone computing system, and a hardware information for the standalone computing system. The standalone computing system sends the encrypted request to a respective regional center of the cloud computing system based on the received region information for the standalone computing system. The respective regional center identifies a software package that is stored in the respective regional center, such that the identified software package corresponds to the received hardware information. The respective regional center compares the received version information for the deployed software package to a version information for the identified software package. In response to determining that the identified software package is more recent than the deployed software package, the respective regional center sends the identified software package to the standalone computing system. The standalone computing system deploys the identified software package. The respective regional center generates an encrypted response based on the encrypted request and sends the encrypted response to the standalone computing system. The standalone computing system decrypts the encrypted response to generate a decrypted response.

In certain embodiments when the standalone computing system is an ATM, the system may be configured to manage advertisements that are displayed by the ATM. In such embodiments, a user accesses a regional data center of the cloud computing system, where the regional data center corresponds to a desired ATM. A user device of the user displays first advertisements playing on the desired ATM. The user device accesses a virtual application for the desired ATM. The virtual application is configured to emulate the desired ATM. The user device displays second advertisements playing on the virtual application. The user compares the first advertisements to the second advertisements. In response to determining that the first advertisements do not match the second advertisements, the user device identifies a software package corresponding to the desired ATM. The user instructs the user device to generate a software package update based on discrepancy between the first advertisements and the second advertisements. The user device sends the software package update to the regional data center. The regional data center updates the identified software package based on the software package update and sends the updated software package to the desired ATM. The desired ATM deploys the updated software package.

The system for upgrading non-permitted operating systems on standalone computing systems allows for upgrading standalone computing systems without relying on vendors of the standalone computing system or developers of the non-permitted operating systems by using software packages deployed to the standalone computing systems. The deployed software packages are updated through a cloud computing system that hosts current versions of the software packages. Accordingly, down time of standalone computing systems may be reduced or eliminated. Furthermore, vulnerabilities due to using non-permitted operating systems may be reduced or eliminated, which in turn improves security of standalone computing systems. In certain embodiments when the standalone computing system is an ATM, the system also allows for managing advertisements that are displayed by the ATM.

Accordingly, the following disclosure is particularly integrated into practical applications of: (1) upgrading non-permitted operating systems on standalone computing systems through a cloud computing system; (2) reducing or eliminating down time of standalone computing systems; and (3) improving security of standalone computing systems.

In one embodiment, a system includes a standalone computing system and a cloud computing system communicatively coupled to the standalone computing system. The standalone computing system includes a first memory and a first processor communicatively coupled to the first memory. The first memory is configured to store a first software package. The first software package includes a first hardware management module and a first client application. The first processor is configured to receive a request from a user and encrypt the request to generate an encrypted request. The encrypted request includes a version information for the first software package, a region information for the standalone computing system, and a hardware information for the standalone computing system. The first processor is further configured to send the encrypted request to a respective regional data center of a cloud computing system based on the region information of the first software package. In response to sending the encrypted request, the first processor is further configured to receive a second software package from the respective regional data center and deploy the second software package. The cloud computing system includes a plurality of regional data centers. The respective regional data center includes a second memory and a second processor communicatively coupled to the second memory. The second memory is configured to store a plurality of software packages. Each software package corresponds to a respective hardware configuration of the standalone computing system. Each software package includes a hardware management module and a client application. The second processor is configured to receive the encrypted request from the standalone computing system and identify the second software package among the plurality of software packages. The second software package corresponds to the hardware information of the first software package. The second processor is further configured to compare the version information of the first software package to a version information of the second software package. In response to identifying that the second software package is more recent than the first software package. The second processor is further configured to send the second software package to the standalone computing system.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1:
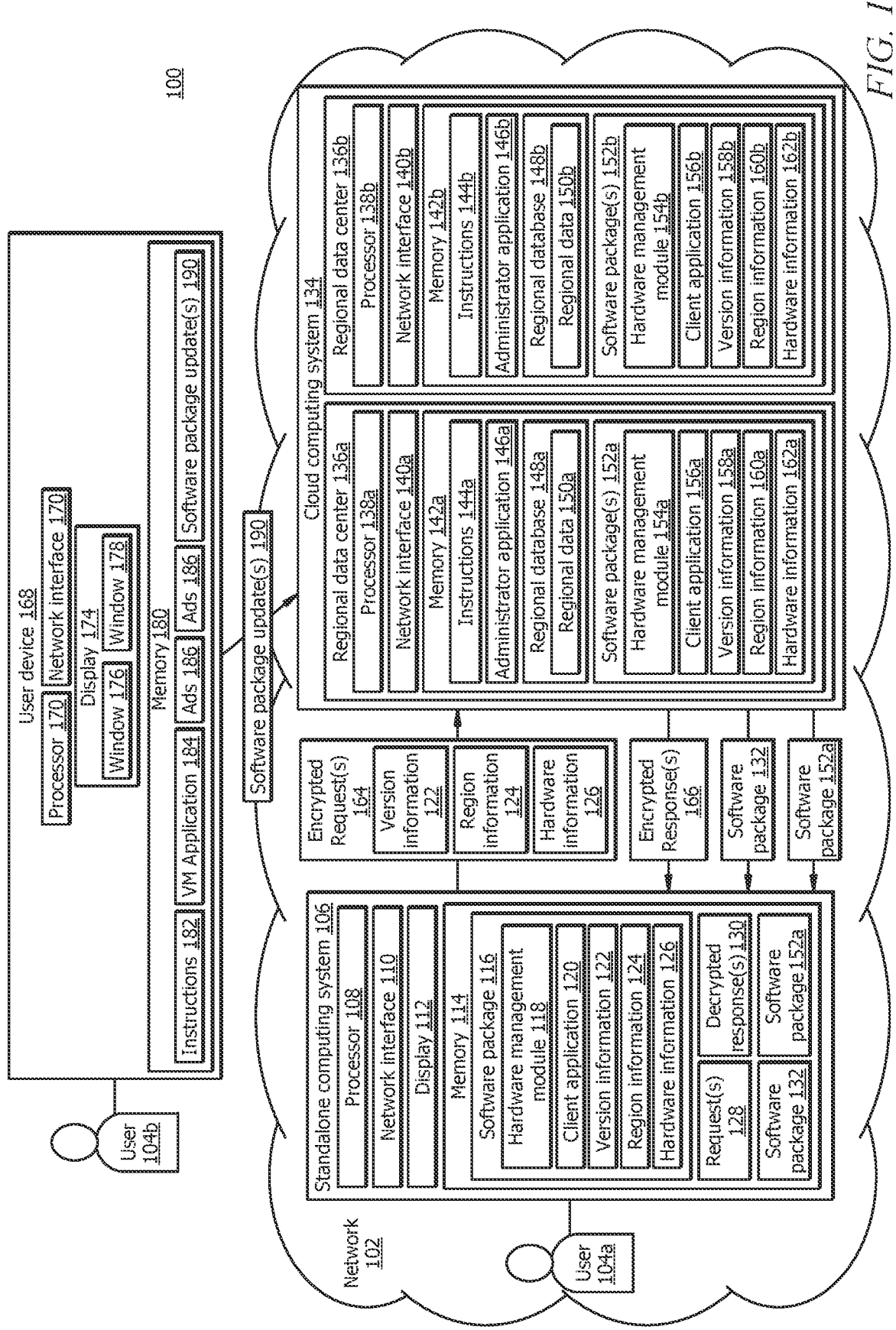
FIG. 1 illustrates an embodiment of a system for upgrading non-permitted operating systems on standalone computing systems.
Figure 2:
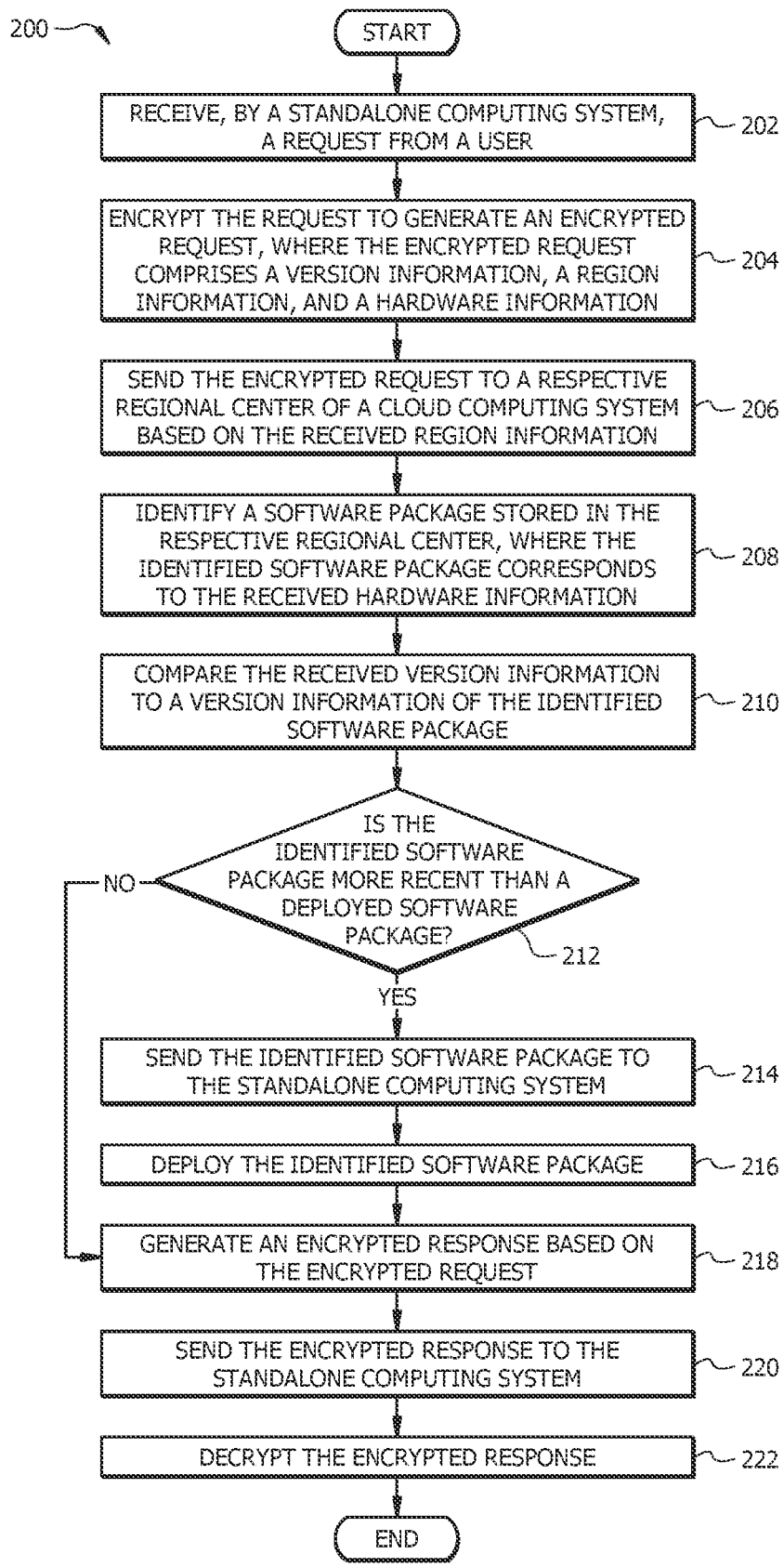
FIG. 2 illustrates an example operational flow of the system of FIG. 1 for upgrading non-permitted operating systems on standalone computing systems.
Figure 3:
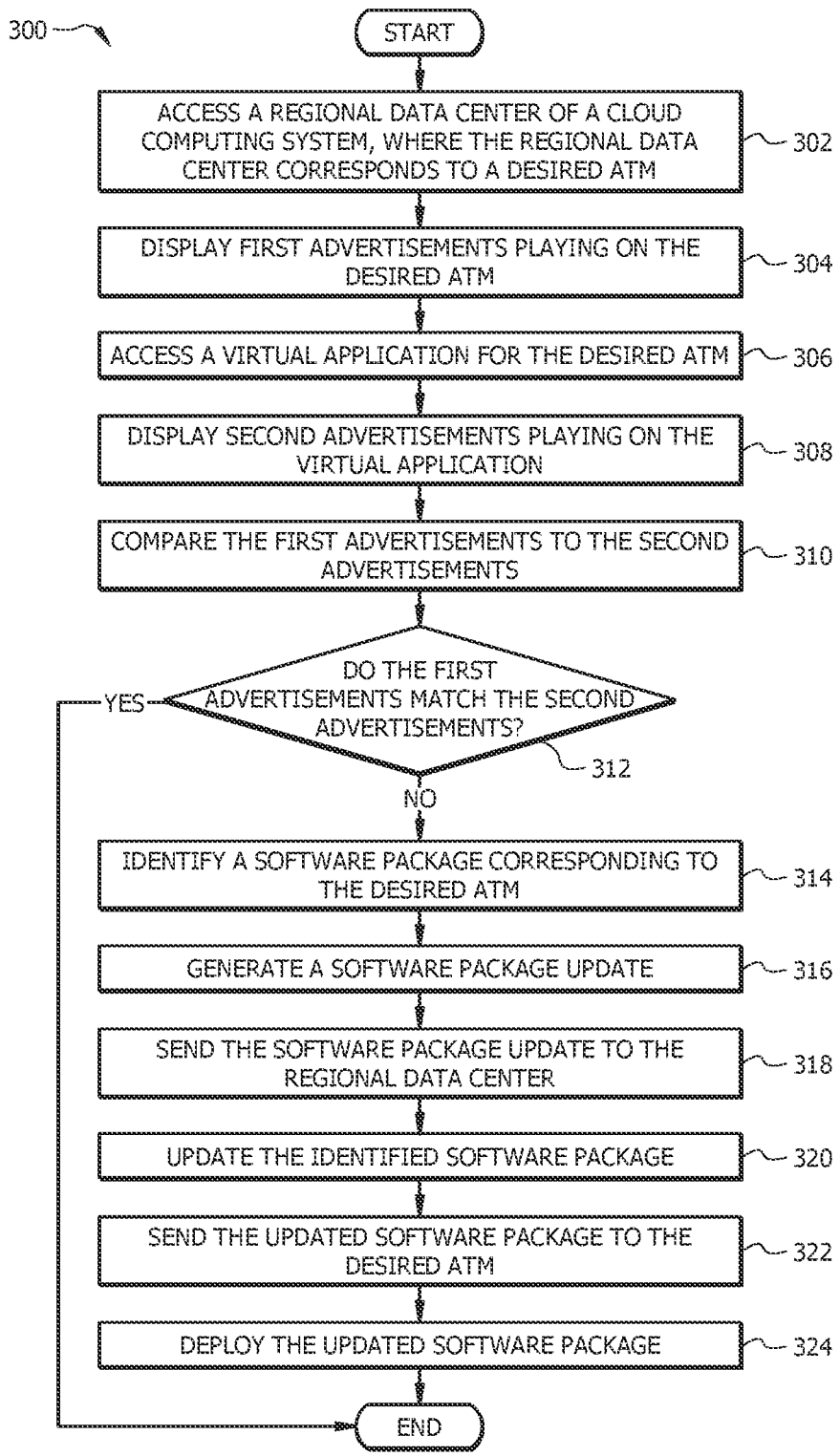
FIG. 3 illustrates an example operational flow of the system of FIG. 1 for managing advertisements displayed by an automated teller machine (ATM).

As described above, previous technologies fail to provide effective systems and methods for upgrading non-permitted operating systems on standalone computing systems. Embodiments of the present disclosure and their advantages may be understood by referring to FIGS. 1, 2 and 3. FIGS. 1, 2 and 3 are used to describe a system and method for upgrading non-permitted operating systems on standalone computing systems.

System Overview

FIG. 1 illustrates an embodiment of a system 100 for upgrading non-permitted operating systems on standalone computing systems. In certain embodiments, the system 100 comprises a cloud computing system 134 operably coupled to a standalone computing system 106 and a user device 168 via a network 102. Network 102 enables the communication between the components of the system 100. The cloud computing system 134 provides services to a user 104a via the standalone computing system 106. A user 104b communicates with the cloud computing system 134 via the user device 168. The standalone computing system 106 and the cloud computing system 134 are managed by a service provider. In certain embodiments, the service provider may be a financial institution (e.g., a bank). In such embodiments, the standalone computing system 106 may be an automated teller machine (ATM), the user 104a may be a client of a bank, which receives services from the cloud computing system 134 via the ATM, and the user 104b may be a bank associate, which manages the ATM and the cloud computing system 134. In other embodiments, the system 100 may not have all the components listed and/or may have other elements instead of, or in addition to, those listed above.

In general, the standalone computing system 106 receives a request 128 from the user 104a and encrypts the request 128 to generate an encrypted request 164. In certain embodiments, in addition to the encrypted information of the request 128, the encrypted request 164 further comprises a version information 122 for a software package 116 deployed in the standalone computing system 106, a region information 124 for the standalone computing system 106, and a hardware information 126 for the standalone computing system 106. The standalone computing system 106 sends the encrypted request 164 to a respective regional center (e.g., regional data center 136a) of the cloud computing system 134 based on the received region information 124. The respective regional center (e.g., regional data center 136a) identifies a software package (e.g., software package 152a) that is stored in the respective regional center (e.g., regional data center 136a) such that the identified software package (e.g., software package 152a) corresponds to the received hardware information 126. The respective regional center (e.g., regional data center 136a) compares the received version information 122 for the deployed software package 116 to a version information (e.g., version information 158a) for the identified software package (e.g., software package 152a). In response to determining that the identified software package (e.g., software package 152a) is more recent than the deployed software package 116, the respective regional center (e.g., regional data center 136a) sends the identified software package (e.g., software package 152a) to the standalone computing system 106. The standalone computing system 106 deploys the identified software package (e.g., software package 152a). The respective regional center (e.g., regional data center 136a) generates an encrypted response 166 based on the encrypted request 164 and sends the encrypted response 166 to the standalone computing system 106. The standalone computing system 106 decrypts the encrypted response 166 to generate a decrypted response 130.

In certain embodiments when the standalone computing system 106 is an ATM, the system 100 may be configured to manage advertisements that are displayed by the ATM. In such embodiments, the user device 168 of the user 104b accesses a regional data center (e.g., regional data center 136b) of the cloud computing system 134, where the regional data center (e.g., a regional data center 136b) corresponds to a desired ATM (e.g., standalone computing system 106). The user device 168 displays first advertisements 186 playing on the desired ATM (e.g., standalone computing system 106). The user device 168 accesses a virtual application (e.g., VM application 184) for the desired ATM (e.g., standalone computing system 106). The virtual application (e.g., VM application 184) is configured to emulate the desired ATM (e.g., standalone computing system 106). The user device 168 displays second advertisements 188 playing on the virtual application (e.g., VM application 184). The user 104*b* compares the first advertisements 186 to the second advertisements 188. In response to determining that the first advertisements 186 do not match the second advertisements 188, the user device 168 identifies a software package (e.g., software package 152*b*) corresponding to the desired ATM (e.g., standalone computing system 106). The user 104*b* instructs the user device 168 to generate a software package update 190 based on discrepancy between the first advertisements 186 and the second advertisements 188. The user device 168 sends the software package update 190 to the regional data center (e.g., regional data center 136*b*). The regional data center (e.g., regional data center 136*b*) updates the identified software package (e.g., software package 152*b*) based on the software package update 190 and sends the updated software package 132 to the desired ATM (e.g., standalone computing system 106). The desired ATM (e.g., standalone computing system 106) deploys the updated software package 132.

System Components

Network

Network 102 may be any suitable type of wireless and/or wired network. The network 102 may or may not be connected to the Internet or public network. The network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. The network 102 may be configured to support any suitable type of communication protocol as would be appreciated by one of ordinary skill in the art.

Standalone Computing System

The standalone computing system 106 is generally any device that is configured to process data and communicate with other components of the system 100 via the network 102. The standalone computing system 106 may comprise a processor 108 in signal communication with a memory 114 and a network interface 110. The standalone computing system 106 may include a user interface, such as a display 112, a microphone, keypad, or other appropriate terminal equipment usable by the user 104*a*. In certain embodiments, the standalone computing system 106 is an ATM.

Processor 108 comprises one or more processors operably coupled to the memory 114. Processor 108 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 108 may be a programmable logic device, a microcontroller, a microprocessor, or any suitable combination of the preceding. The one or more processors are configured to process data and may be implemented in hardware or software. For example, processor 108 may be 8-bit, 16-bit, 32-bit, 64-bit, or of any other suitable architecture. The one or more processors are configured to implement various software instructions to perform the operations described herein. For example, the one or more processors are configured to execute software instructions (e.g., software package 116) and perform one or more functions described herein.

Network interface 110 is configured to enable wired and/or wireless communications (e.g., via network 102). Network interface 110 is configured to communicate data between the standalone computing system 106 and other components of the system 100. For example, the network interface 110 may comprise a WIFI interface, a local area network (LAN) interface, a wide area network (WAN) interface, a modem, a switch, or a router. Processor 108 is configured to send and receive data using the network interface 110. Network interface 110 may be configured to use any suitable type of communication protocol as would be appreciated by one of ordinary skill in the art.

Memory 114 comprises a non-transitory computer-readable medium such as one or more disks, tape drives, or solid-state drives, and may be used as an over-flow data storage device, to store programs when such programs are selected for execution, and to store instructions and data that are read during program execution. Memory 114 may be volatile or non-volatile and may comprise a read-only memory (ROM), random-access memory (RAM), ternary content-addressable memory (TCAM), dynamic random-access memory (DRAM), and static random-access memory (SRAM). Memory 114 may be implemented using one or more disks, tape drives, solid-state drives, and/or the like. Memory 114 may store any of the information described in FIGS. 1, 2 and 3 along with any other data, instructions, logic, rules, or code operable to implement the function(s) described herein. Memory 114 is operable to store software instructions (e.g., software package 116), and/or any other data and instructions. The software instructions may comprise any suitable set of software instructions, logic, rules, or code operable to be executed by the processor 108.

In certain embodiments, the software package 116 comprises a hardware management module 118 and a client application 120. The hardware management module 118, when executed by the processor 108, allows the processor 108 to control the hardware of the standalone computing system 106. The client application 120, when executed by the processor 108, allows the processor 108 to communicated with the user 104*a* and the cloud computing system 134. The software package 116 may further comprise a version information 122 of the software package 116, a region information 124 for the standalone computing system 106, and a hardware information 126 for the standalone computing system 106. The version information 122 of the software package 116 may comprise a version number, such that a greater version number corresponds to a more recent version of the software package 116. The region information 124 for the standalone computing system 106 may include any information identifying a location of the standalone computing system 106, for example, an IP address of the standalone computing system 106. The hardware information 126 for the standalone computing system 106 may include a processor clock speed, a number of processor cores, a screen resolution, a total memory, or the like.

In operation, the processor 108 of the standalone computing system 106 is configured to receive a request 128 from a user 104*a*. In certain embodiments when the standalone computing system 106 is an ATM, the request 128 may comprise a request to perform a desired interaction with the ATM. The processor 108 of the standalone computing system 106 encrypts the request 128 to generate an encrypted request 164. In certain embodiments, the processor 108 of the standalone computing system 106 may execute any appropriate encryption algorithm to perform the encryption. In certain embodiments, in addition to the encrypted information of the request 128, the encrypted request 164 further comprises a version information 122 for a software package 116 that is deployed in the standalone computing system 106, a region information 124 for the standalone computing system 106, and a hardware information 126 for the standalone computing system 106. The version information 122 of the software package 116 may comprise a version number, such that a greater version number corresponds to a more recent version of the deployed software package 116. The region information 124 for the standalone computing system 106 may include any information identifying a location of the standalone computing system 106, for example, an IP address of the standalone computing system 106. The hardware information 126 for the standalone computing system 106 may include a processor clock speed, a number of processor cores, a screen resolution, a total memory, or the like.

The processor 108 of the standalone computing system 106 sends the encrypted request 164 to a respective regional center (e.g., regional data center 136a) of the cloud computing system 134 based on the received region information 124. The processor 108 of the standalone computing system 106 receives a software package (e.g., software package 152a of FIG. 1) from the respective regional center (e.g., regional data center 136a), such that software package (e.g., software package 152a of FIG. 1) is more recent than the deployed software package 116. The processor 108 of the standalone computing system 106 deploys the received software package (e.g., software package 152a). In certain embodiments, the deployment process comprises replacing the deployed software package 116 with the received software package (e.g., software package 152a). The processor 108 of the standalone computing system 106 receives an encrypted response 166 from the respective regional center (e.g., regional data center 136a) and decrypts the encrypted response 166 to generate a decrypted response 130. In certain embodiments, the processor 108 of the standalone computing system 106 may execute any appropriate decryption algorithm to perform the decryption.

In certain embodiments when the standalone computing system 106 is an ATM, the ATM (e.g., standalone computing system 106) receives the updated software package 132 from a regional data center (e.g., regional data center 136b) of the cloud computing system 134. A processor (e.g., processor 108) of the ATM (e.g., standalone computing system 106) deploys the updated software package 132. In certain embodiments, the deployment process comprises replacing a software package 116 deployed in the ATM (e.g., standalone computing system 106) with the updated software package 132.

Cloud Computing System

The cloud computing system 134 is configured to provide various services to the user 104a via the standalone computing system 106. The cloud computing system 134 may include a plurality of regional data centers, such as regional data centers 136a and 136b. In the illustrated embodiment, the cloud computing system 134 comprises two regional data centers. In other embodiments, the cloud computing system 134 may comprise more than two regional data centers. The regional data center 136a (136b) is generally any device that is configured to process data and communicate with other components of the system 100 via the network 102. The regional data center 136a (136b) may comprise a processor 138a (138b) in signal communication with a memory 142a (142b) and a network interface 140a (140b).

Processor 138a (138b) comprises one or more processors operably coupled to the memory 142a (142b). Processor 138a (138b) is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 138a (138b) may be a programmable logic device, a microcontroller, a microprocessor, or any suitable combination of the preceding. The one or more processors are configured to process data and may be implemented in hardware or software. For example, processor 138a (138b) may be 8-bit, 16-bit, 32-bit, 64-bit, or of any other suitable architecture. The one or more processors are configured to implement various software instructions to perform the operations described herein. For example, the one or more processors are configured to execute software instructions 144a (144b) and an administrator application 146a (146b), and perform one or more functions described herein.

Network interface 140a (140b) is configured to enable wired and/or wireless communications (e.g., via network 102). Network interface 140a (140b) is configured to communicate data between the regional data center 136a (136b) and other components of the system 100. For example, the network interface 140a (140b) may comprise a WIFI interface, a local area network (LAN) interface, a wide area network (WAN) interface, a modem, a switch, or a router. Processor 138a (138b) is configured to send and receive data using the network interface 140a (140b). Network interface 140a (140b) may be configured to use any suitable type of communication protocol as would be appreciated by one of ordinary skill in the art.

Memory 142a (142b) comprises a non-transitory computer-readable medium such as one or more disks, tape drives, or solid-state drives, and may be used as an over-flow data storage device, to store programs when such programs are selected for execution, and to store instructions and data that are read during program execution. Memory 142a (142b) may be volatile or non-volatile and may comprise a read-only memory (ROM), random-access memory (RAM), ternary content-addressable memory (TCAM), dynamic random-access memory (DRAM), and static random-access memory (SRAM). Memory 142a (142b) may be implemented using one or more disks, tape drives, solid-state drives, and/or the like. Memory 142a (142b) may store any of the information described in FIGS. 1, 2 and 3 along with any other data, instructions, logic, rules, or code operable to implement the function(s) described herein. Memory 142a (142b) is operable to store software instructions 144a (144b) and an administrator application 146a (146b), and/or any other data and instructions. The software instructions 144a (144b) and the administrator application 146a (146b) may comprise any suitable set of software instructions, logic, rules, or code operable to be executed by the processor 138a (138b).

Memory 142a (142b) is further operable to store a regional database 148a (148b), which comprises regional data 150a (150b). In certain embodiments when the standalone computing system 106 is configured access the regional data center 136a, the standalone computing system 106 accesses the regional data 150a of the regional database 148a. In certain embodiments when the standalone computing system 106 is configured access the regional data center 136b, the standalone computing system 106 accesses the regional data 150b of the regional database 148b.

Memory 142*a* (142*b*) is further operable to store software packages 152*a* (152*b*). The software packages 152*a* (152*b*) are most recent versions of software packages. Each software package 152*a* (152*b*) comprises a hardware management module 154*a* (154*b*) and a client application 156*a* (156*b*). The software package 152*a* (152*b*) may further comprise a version information 158*a* (158*b*) of the software package 152*a* (152*b*), a region information 160*a* (160*b*) for a respective standalone computing system (e.g., standalone computing system 106), and a hardware information 162*a* (162*b*) for the respective standalone computing system. The version information 158*a* (158*b*) of the software package 152*a* (152*b*) may comprise a version number, such that a greater version number corresponds to a more recent version of the software package 152*a* (152*b*). The region information 160*a* (160*b*) may include any information identifying a location of the respective standalone computing system, for example, an IP address. The hardware information 162*a* (162*b*) for the respective standalone computing system may include a processor clock speed, a number of processor cores, a screen resolution, a total memory, or the like.

In operation, a processor (e.g., processor 138*a*) of a regional center (e.g., regional data center 136*a*) of the cloud computing system 134 receives the encrypted request 164 from the standalone computing system 106. The processor (e.g., processor 138*a*) of the respective regional center (e.g., regional data center 136*a*) identifies a software package (e.g., software package 152*a*) that is stored in the respective regional center (e.g., regional data center 136*a*) such that the identified software package (e.g., software package 152*a*) corresponds to the received hardware information 126. In certain embodiments, the processor (e.g., processor 138*a*) of the respective regional center (e.g., regional data center 136*a*) identifies the identified software package (e.g., software package 152*a* of) by determining that the received hardware information 126 matches a hardware information (e.g., hardware information 162*a*) of the identified software package (e.g., software package 152*a*). The processor (e.g., processor 138*a*) of the respective regional center (e.g., regional data center 136*a*) compares the received version information 122 for the deployed software package 116 to a version information (e.g., version information 158*a*) for the identified software package (e.g., software package 152*a*). In response to determining that the identified software package (e.g., software package 152*a*) is more recent than the deployed software package 116, the processor (e.g., processor 138*a*) of the respective regional center (e.g., regional data center 136*a*) sends the identified software package (e.g., software package 152*a*) to the standalone computing system 106. In certain embodiments, the processor (e.g., processor 138*a*) of the respective regional center (e.g., regional data center 136*a*) encrypts the identified software package (e.g., software package 152*a* of FIG. 1) before sending it to the standalone computing system 106.

In certain embodiments, a processor (e.g., processor 138*b*) of a regional data center (e.g., regional data center 136*b*) receives the software package update 190 from the user device 168, updates a software package (e.g., software package 152*b*) based on the software package update 190, and sends the updated software package 132 to the standalone computing system 106. In certain embodiments, the processor (e.g., processor 138*b*) of the regional center (e.g., regional data center 136*b*) encrypts the updated software package 132 before sending it to the standalone computing system 106.

User Device

The user device 168 is generally any device that is configured to process data and communicate with other components of the system 100 via the network 102. The user 104*b* communicates with the cloud computing system 134 via the user device 168. The user device 168 may comprise a processor 170 in signal communication with a memory 180 and a network interface 172. The user device 168 may include a user interface, such as a display 174, a microphone, keypad, or other appropriate terminal equipment usable by the user 104*b*.

Processor 170 comprises one or more processors operably coupled to the memory 180. Processor 170 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 170 may be a programmable logic device, a microcontroller, a microprocessor, or any suitable combination of the preceding. The one or more processors are configured to process data and may be implemented in hardware or software. For example, processor 170 may be 8-bit, 16-bit, 32-bit, 64-bit, or of any other suitable architecture. The one or more processors are configured to implement various software instructions to perform the operations described herein. For example, the one or more processors are configured to execute software instructions 182 and a virtual machine (VM) application 184, and perform one or more functions described herein.

Network interface 172 is configured to enable wired and/or wireless communications (e.g., via network 102). Network interface 172 is configured to communicate data between the user device 168 and other components of the system 100. For example, the network interface 172 may comprise a WIFI interface, a local area network (LAN) interface, a wide area network (WAN) interface, a modem, a switch, or a router. Processor 170 is configured to send and receive data using the network interface 172. Network interface 172 may be configured to use any suitable type of communication protocol as would be appreciated by one of ordinary skill in the art.

Memory 180 comprises a non-transitory computer-readable medium such as one or more disks, tape drives, or solid-state drives, and may be used as an over-flow data storage device, to store programs when such programs are selected for execution, and to store instructions and data that are read during program execution. Memory 180 may be volatile or non-volatile and may comprise a read-only memory (ROM), random-access memory (RAM), ternary content-addressable memory (TCAM), dynamic random-access memory (DRAM), and static random-access memory (SRAM). Memory 180 may be implemented using one or more disks, tape drives, solid-state drives, and/or the like. Memory 180 may store any of the information described in FIGS. 1, 2 and 3 along with any other data, instructions, logic, rules, or code operable to implement the function(s) described herein. The memory 180 is operable to store software instructions 182, the virtual machine (VM) application 184, and/or any other data and instructions. The software instructions 182 and the virtual machine (VM) application 184 may comprise any suitable set of software instructions, logic, rules, or code operable to be executed by the processor 170.

In operation, the user 104*b* accesses a regional data center (e.g., regional data center 136*b*) of the cloud computing system 134, where the regional data center (e.g., a regional data center 136*b*) corresponds to a desired ATM (e.g., standalone computing system 106). In certain embodiments, a user device 168 of the user 104b accesses the regional data center (e.g., regional data center 136b) via an administrator application (e.g., administrator application 146b) of the regional data center (e.g., regional data center 136b of FIG. 1). The processor 170 of the user device 168 displays first advertisements 186 playing on the desired ATM (e.g., standalone computing system 106). In certain embodiments, the processor 170 of the user device 168 instructs a display 174 of the user device 168 to display the first advertisements 186 in a first window 176. The processor 170 of the user device 168 accesses a virtual application (e.g., VM application 184) for the desired ATM (e.g., standalone computing system 106). The virtual application (e.g., VM application 184) is configured to emulate the desired ATM (e.g., standalone computing system 106). The processor 170 of the user device 168 displays second advertisements 188 playing on the virtual application (e.g., VM application 184). In certain embodiments, the processor 170 of the user device 168 instructs the display 174 of the user device 168 to display the second advertisements 188 in a second window 178. The user 104b compares the first advertisements 186 to the second advertisements 188.

In response to determining that the first advertisements 186 do not match the second advertisements 188, the processor 170 of the user device 168 identifies a software package (e.g., software package 152b) corresponding to the desired ATM (e.g., standalone computing system 106). In certain embodiments, the processor 170 of the user device 168 identifies the software package (e.g., software package 152b) by comparing a hardware information 126 for a deployed software package 116 of the desired ATM (e.g., standalone computing system 106) and a hardware information 162b for the identified software package (e.g., software package 152b).

The user 104b instructs the processor 170 of the user device 168 to generate a software package update 190 based on discrepancy between the first advertisements 186 and the second advertisements 188. In certain embodiments when content of the first advertisements 186 is different from content of the second advertisements 188, the software package update 190 comprises updates to a client application (e.g., client application 156b) of the identified software package (e.g., software package 152b). In certain embodiments when the content of the first advertisements 186 is same as the content of the second advertisements 188 but they are displayed in different manner due to screen resolution mismatch, the software package update 190 comprises updates to a hardware management module (e.g., hardware management module 154b) of the identified software package (e.g., software package 152b). The processor 170 of the user device 168 sends the software package update 190 to the regional data center (e.g., regional data center 136b).

Example Method for Upgrading Non-Permitted Operating Systems on Standalone Computing Systems FIG. 2 illustrates an example flowchart of a method 200 for upgrading non-permitted operating systems on standalone computing systems. Modifications, additions, or omissions may be made to method 200. Method 200 may include more, fewer, or other operations. For example, operations may be performed in parallel or in any suitable order. For example, one or more operations of method 200 may be implemented, at least in part, in the form of the software instructions (e.g., software package 116, instructions 144a, 144b, and 182, administrator applications 146a and 146b, and/or VM application 184 of FIG. 1), stored on non-transitory, tangible, computer-readable medium (e.g., memories 114, 142a, 142b, and/or 180 of FIG. 1) that when executed by one or more processors (e.g., processors 108, 138a, 138b, and/or 170 of FIG. 1) may cause the one or more processors to perform operations 202-222.

Method 200 starts with operation 202, where a processor 108 of a standalone computing system 106 receives a request 128 from a user 104a. In certain embodiments when the standalone computing system 106 is an ATM, the request 128 may comprise a request to perform a desired interaction with the ATM.

At operation 204, the processor 108 of the standalone computing system 106 encrypts the request 128 to generate an encrypted request 164. In certain embodiments, the processor 108 of the standalone computing system 106 may execute any appropriate encryption algorithm to perform encryption. In certain embodiments, in addition to the encrypted information of the request 128, the encrypted request 164 further comprises a version information 122 for a deployed software package 116, a region information 124 for the standalone computing system 106, and a hardware information 126 for the standalone computing system 106. The version information 122 of the software package 116 may comprise a version number, such that a greater version number corresponds to a more recent version of the deployed software package 116. The region information 124 for the standalone computing system 106 may include any information identifying a location of the standalone computing system 106, for example, an IP address of the standalone computing system 106. The hardware information 126 for the standalone computing system 106 may include a processor clock speed, a number of processor cores, a screen resolution, a total memory, or the like.

At operation 206, the processor 108 of the standalone computing system 106 sends the encrypted request 164 to a respective regional center (e.g., regional data center 136a of FIG. 1) of a cloud computing system 134 based on the received region information 124.

At operation 208, a processor (e.g., processor 138a of FIG. 1) of the respective regional center (e.g., regional data center 136a of FIG. 1) identifies a software package (e.g., software package 152a of FIG. 1) that is stored in the respective regional center (e.g., regional data center 136a of FIG. 1). The identified software package (e.g., software package 152a of FIG. 1) corresponds to the received hardware information 126. In certain embodiments, the processor (e.g., processor 138a of FIG. 1) of the respective regional center (e.g., regional data center 136a of FIG. 1) identifies the identified software package (e.g., software package 152a of FIG. 1) by determining that the received hardware information 126 matches a hardware information (e.g., hardware information 162a of FIG. 1) of the identified software package (e.g., software package 152a of FIG. 1).

At operation 210, the processor (e.g., processor 138a of FIG. 1) of the respective regional center (e.g., regional data center 136a of FIG. 1) compares the received version information 122 for the deployed software package 116 to a version information (e.g., version information 158a of FIG. 1) for the identified software package (e.g., software package 152a of FIG. 1).

At operation 212, the processor (e.g., processor 138a of FIG. 1) of the respective regional center (e.g., regional data center 136a of FIG. 1) determines if the identified software package (e.g., software package 152a of FIG. 1) is more recent than the deployed software package 116.

In response to determining at operation 212 that the identified software package (e.g., software package 152a of FIG. 1) is not more recent than the deployed software package 116, method 200 continues to operation 218.

In response to determining at operation 212 that the identified software package (e.g., software package 152a of FIG. 1) is more recent than the deployed software package 116, method 200 continues to operation 214. At operation 214, the processor (e.g., processor 138a of FIG. 1) of the respective regional center (e.g., regional data center 136a of FIG. 1) sends the identified software package (e.g., software package 152a of FIG. 1) to the standalone computing system 106. In certain embodiments, the processor (e.g., processor 138a of FIG. 1) of the respective regional center (e.g., regional data center 136a of FIG. 1) encrypts the identified software package (e.g., software package 152a of FIG. 1) before sending it to the standalone computing system 106.

At operation 216, the processor 108 of the standalone computing system 106 deploys the identified software package (e.g., software package 152a of FIG. 1). In certain embodiments, the deployment process comprises replacing the deployed software package 116 with the identified software package (e.g., software package 152a of FIG. 1).

After performing operation 216 or in response to determining at operation 212 that the identified software package (e.g., software package 152a of FIG. 1) is not more recent than the deployed software package 116, method 200 continues to operation 218. At operation 218, the processor (e.g., processor 138a of FIG. 1) of the respective regional center (e.g., regional data center 136a of FIG. 1) generates an encrypted response 166 based on the encrypted request 164. At operation 220, the processor (e.g., processor 138a of FIG. 1) of the respective regional center (e.g., regional data center 136a of FIG. 1) sends the encrypted response 166 to the standalone computing system 106.

At operation 222, the processor 108 of the standalone computing system 106 decrypts the encrypted response 166 to generate a decrypted response 130. In certain embodiments, the processor 108 of the standalone computing system 106 may execute any appropriate decryption algorithm to perform decryption. After performing operation 222, method 200 ends.

Example Method for Managing Advertisements Displayed by an Automated Teller Machine (ATM)

FIG. 3 illustrates an example flowchart of a method 300 for managing advertisements displayed by an automated teller machine (ATM). Modifications, additions, or omissions may be made to method 300. Method 300 may include more, fewer, or other operations. For example, operations may be performed in parallel or in any suitable order. For example, one or more operations of method 300 may be implemented, at least in part, in the form of the software instructions (e.g., software package 116, instructions 144a, 144b, and 182, administrator applications 146a and 146b, and/or VM application 184 of FIG. 1), stored on non-transitory, tangible, computer-readable medium (e.g., memories 114, 142a, 142b, and/or 180 of FIG. 1) that when executed by one or more processors (e.g., processors 108, 138a, 138b, and/or 170 of FIG. 1) may cause the one or more processors to perform operations 302-324.

Method 300 starts with operation 302, where a user 104b accesses a regional data center (e.g., regional data center 136b of FIG. 1) of a cloud computing system 134, where the regional data center (e.g., a regional data center 136b of FIG. 1) corresponds to a desired ATM (e.g., standalone computing system 106 of FIG. 1). In certain embodiments, a user device 168 of the user 104b accesses the regional data center (e.g., regional data center 136b of FIG. 1) via an administrator application (e.g., administrator application 146b of FIG. 1) of the regional data center (e.g., regional data center 136b of FIG. 1).

At operation 304, a processor 170 of the user device 168 displays first advertisements 186 playing on the desired ATM (e.g., standalone computing system 106 of FIG. 1). In certain embodiments, the processor 170 of the user device 168 instructs a display 174 of the user device 168 to display the first advertisements 186 in a first window 176.

At operation 306, the processor 170 of the user device 168 accesses a virtual application (e.g., VM application 184 of FIG. 1) for the desired ATM (e.g., standalone computing system 106 of FIG. 1). The virtual application (e.g., VM application 184 of FIG. 1) is configured to emulate the desired ATM (e.g., standalone computing system 106 of FIG. 1).

At operation 308, the processor 170 of the user device 168 displays second advertisements 188 playing on the virtual application (e.g., VM application 184 of FIG. 1). In certain embodiments, the processor 170 of the user device 168 instructs the display 174 of the user device 168 to display the second advertisements 188 in a second window 178.

At operation 310, the user 104b compares the first advertisements 186 to the second advertisements 188.

At operation 312, the user 104b determines if the first advertisements 186 match the second advertisements 188. In response to determining at operation 312 that the first advertisements 186 match the second advertisements 188, method 300 ends.

In response to determining at operation 312 that the first advertisements 186 do not match the second advertisements 188, method 300 continues to operation 314. At operation 314, the processor 170 of the user device 168 identifies a software package (e.g., software package 152b of FIG. 1) corresponding to the desired ATM (e.g., standalone computing system 106 of FIG. 1). In certain embodiments, the processor 170 of the user device 168 identifies the software package (e.g., software package 152b of FIG. 1) by comparing a hardware information 126 for a deployed software package 116 of the desired ATM (e.g., standalone computing system 106 of FIG. 1) and a hardware information 162b for the identified software package (e.g., software package 152b of FIG. 1).

At operation 316, the user 104b instructs the processor 170 of the user device 168 to generate a software package update 190 based on discrepancy between the first advertisements 186 and the second advertisements 188. In certain embodiments when content of the first advertisements 186 is different from content of the second advertisements 188, the software package update 190 comprises updates to a client application (e.g., client application 156b of FIG. 1) of the identified software package (e.g., software package 152b of FIG. 1). In certain embodiments when the content of the first advertisements 186 is same as the content of the second advertisements 188 but they are displayed in different manner due to screen resolution mismatch, the software package update 190 comprises updates to a hardware management module (e.g., hardware management module 154b of FIG. 1) of the identified software package (e.g., software package 152b of FIG. 1).

At operation 318, the processor 170 of the user device 168 sends the software package update 190 to the regional data center (e.g., regional data center 136b of FIG. 1).

At operation 320, a processor (e.g., processor 138b of FIG. 1) of the regional data center (e.g., regional data center 136b of FIG. 1) updates the identified software package (e.g., software package 152b of FIG. 1) based on the software package update 190.

At operation 322, the processor (e.g., processor 138b of FIG. 1) of the regional data center (e.g., regional data center 136b of FIG. 1) sends the updated software package 132 to the desired ATM (e.g., standalone computing system 106 of FIG. 1). In certain embodiments, the processor (e.g., processor 138b of FIG. 1) of the regional center (e.g., regional data center 136b of FIG. 1) encrypts the updated software package 132 before sending it to the desired ATM (e.g., standalone computing system 106 of FIG. 1).

At operation 324, a processor (e.g., processor 108 of FIG. 1) of the desired ATM (e.g., standalone computing system 106 of FIG. 1) deploys the updated software package 132. In certain embodiments, the deployment process comprises replacing the deployed software package 116 with the updated software package 132. After performing operation 324, method 300 ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system comprising:
a standalone computing system comprising:
a first memory configured to store a first software package, wherein the first software package comprises:
a first hardware management module; and
a first client application; and
a first processor communicatively coupled to the first memory, wherein the first processor is configured to:
receive a request from a user;
encrypt the request to generate an encrypted request, wherein the encrypted request comprises a version information for the first software package, a region information for the standalone computing system, and a hardware information for the standalone computing system;
send the encrypted request to a respective regional data center of a cloud computing system based on the region information of the first software package;
in response to sending the encrypted request, receive a second software package from the respective regional data center; and
deploy the second software package; and
the cloud computing system communicatively coupled to the standalone computing system, the cloud computing system comprising a plurality of regional data centers, wherein the respective regional data center comprises:
a second memory configured to store a plurality of software packages, wherein each software package corresponds to a respective hardware configuration of the standalone computing system, and wherein each software package comprises:
a hardware management module; and
a client application; and
a second processor communicatively coupled to the second memory, wherein the second processor is configured to:
receive the encrypted request from the standalone computing system;
identify the second software package among the plurality of software packages, wherein the second software package corresponds to the hardware information of the first software package;
compare the version information of the first software package to a version information of the second software package; and
in response to identifying that the second software package is more recent than the first software package, send the second software package to the standalone computing system.

2. The system of claim 1, wherein:
the second processor is further configured to:
generate an encrypted response based on the encrypted request; and
send the encrypted response to the standalone computing system; and
the first processor is further configured to:
receive the encrypted response from the respective regional data center; and
decrypt the encrypted response.

3. The system of claim 1, wherein the first hardware management module of the first software package is different from a second hardware management module of the second software package.

4. The system of claim 1, wherein the first client application of the first software package is different from a second client application of the second software package.

5. The system of claim 1, wherein the standalone computing system comprises an automated teller machine (ATM).

6. The system of claim 1, wherein deploying the second software package comprises replacing the first software package with the second software package.

7. The system of claim 1, wherein the second processor is configured to:
before sending the second software package to the standalone computing system, encrypt the second software package.

8. A method comprising:
receiving a request from a user;
encrypting the request to generate an encrypted request, wherein the encrypted request comprises:
a version information for a first software package deployed in a standalone computing system, wherein the first software package comprises:
a first hardware management module; and
a first client application;
a region information for the standalone computing system; and
a hardware information for the standalone computing system;
sending the encrypted request to a respective regional data center of a cloud computing system based on the region information of the first software package;
identifying a second software package among a plurality of software packages that are stored in the respective regional data center, wherein the second software package corresponds to the hardware information of the first software package, and wherein the second software package comprises:
a second hardware management module; and
a second client application;
comparing the version information of the first software package to a version information of the second software package;
in response to identifying that the second software package is more recent than the first software package, sending the second software package to the standalone computing system; and
deploying the second software package in the standalone computing system.

9. The method of claim 8, further comprising:
generating an encrypted response based on the encrypted request;
sending the encrypted response to the standalone computing system; and
decrypting the encrypted response.

10. The method of claim 8, wherein the first hardware management module of the first software package is different from the second hardware management module of the second software package.

11. The method of claim 8, wherein the first client application of the first software package is different from the second client application of the second software package.

12. The method of claim 8, wherein the standalone computing system comprises an automated teller machine (ATM).

13. The method of claim 8, wherein deploying the second software package comprises replacing the first software package with the second software package.

14. The method of claim 8, further comprising:
before sending the second software package to the standalone computing system, encrypting the second software package.

15. A non-transitory computer-readable medium storing instructions that, when executed by one or more processors, cause the one or more processors to:
receive a request from a user;
encrypt the request to generate an encrypted request, wherein the encrypted request comprises:
a version information for a first software package deployed in a standalone computing system, wherein the first software package comprises:
a first hardware management module; and
a first client application;
a region information for the standalone computing system; and
a hardware information for the standalone computing system;
send the encrypted request to a respective regional data center of a cloud computing system based on the region information of the first software package;
identify a second software package among a plurality of software packages that are stored in the respective regional data center, wherein the second software package corresponds to the hardware information of the first software package, and wherein the second software package comprises:
a second hardware management module; and
a second client application;
compare the version information of the first software package to a version information of the second software package;
in response to identifying that the second software package is more recent than the first software package, send the second software package to the standalone computing system; and
deploy the second software package in the standalone computing system.

16. The non-transitory computer-readable medium of claim 15, wherein the instructions, when executed by the one or more processors, further cause the one or more processors to:
generate an encrypted response based on the encrypted request;
send the encrypted response to the standalone computing system; and
decrypt the encrypted response.

17. The non-transitory computer-readable medium of claim 15, wherein the first hardware management module of the first software package is different from the second hardware management module of the second software package.

18. The non-transitory computer-readable medium of claim 15, wherein the first client application of the first software package is different from the second client application of the second software package.

19. The non-transitory computer-readable medium of claim 15, wherein the standalone computing system comprises an automated teller machine (ATM).

20. The non-transitory computer-readable medium of claim 15, wherein deploying the second software package comprises replacing the first software package with the second software package.

* * * * *